United States Patent Office 3,453,365
Patented July 1, 1969

---

3,453,365
SUBSTITUTED QUINOXALINES AS FUNGICIDES
David William John Lane, Barton, and Geoffrey Tattersall Newbold, Saffron Walden, England, assignors to Fisons Limited, Felixstowe, Suffolk, England
No Drawing. Continuation-in-part of application Ser. No. 270,821, Apr. 5, 1963. This application Mar. 7, 1966, Ser. No. 532,092
Claims priority, application Great Britain, Apr. 12, 1962, 14,110/62
Int. Cl. A01n 9/22; C07d 51/78
U.S. Cl. 424—250    7 Claims

ABSTRACT OF THE DISCLOSURE

Quinoxaline compounds having the formula

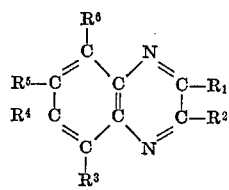

wherein $R^1$ and $R^2$, independently, are selected from the group consisting of H, lower alkyl, phenyl halobenzyl, di-halobenzyl, carboxy, carbonamide, hydroxy, halogen, lower alkoxy, and phenyl substituted with one to two substituents selected from the group consisting of halogen, lower alkyl and hydroxy benzyl, and wherein $R^3$, $R^4$, $R^5$ and $R^6$, independently, are selected from the group consisting of H, halogen, lower alkyl, lower alkoxy, amino, lower alkyl-amino, di-lower alkylamino, alkanoylamino, nitro and lower alkyl substituted with one to two halogen atoms at least one of $R^1$, $R^2$, $R^3$, $R^4$, $R^5$ and $R^6$ being other than H, at least one of $R^1$, $R^2$, $R^3$ and $R^6$ being other than H when $R^4$ and $R^5$ are both methyl and when $R^4$ and $R^5$ are both Cl, and at least one of $R^1$, $R^2$, $R^3$, $R^4$ and $R^6$ being other than H when $R^5$ is Cl, are valuable fungicides for the protection of plants.

---

This application is a continuation-in-part of U.S. application Serial No. 270,821, filed April 5, 1963, and now abandoned.

The present invention relates to improvements in fungicides. It has been found that certain quinoxaline derivatives as hereinafter defined are highly active fungicides, for example, against Erysiphe cichoracearum (cucumber mildew).

Accordingly, in the first aspect, the present invention is directed to a process for treating plants subject to fungicidal attack by applying thereto a fungicidal effective amount, either alone or admixed with an inert carrier or other fungicidal compounds, a quinoxaline derivative of the formula:

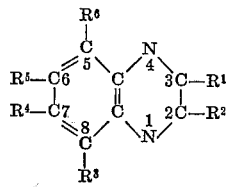

or salts or functional derivatives thereof, wherein $R^1$ and $R^2$ independently, can be hydrogen, lower alkyl (for example methyl or ethyl), carboxy, aryl (for example phenyl), phenyl substituted with one or two substituents such as halogen, particularly chlorine, fluorine and bromine, lower alkyl and hydroxy (for example chloro-phenyl, di-chloro phenyl, methyl-phenyl or hydroxyphenyl), aralkyl (for example benzyl), benzyl substituted with one to two halogen radicals (for example, chlorobenzyl or fluoro-benzyl), halogen (for example fluoro, chloro, or bromo), or lower alkoxy (for example methoxy or ethoxy); and wherein $R^3$, $R^4$, $R^5$ and $R^6$, independently, can be hydrogen, halogen (for example chloro or bromo), lower alkyl (for example methyl or propyl), lower alkoxy (for example methoxy or ethoxy), amino, lower alkyl amino (for example methylamino or ethylamino), di-lower alkylamino (for example dimethyl- or diethyl-amino), lower alkanoylamino (for example acetyl-amino), nitro or lower alkyl containing from one to two halogen atoms (for example chloroethyl or dibromo-ethyl), at least one of $R^1$, $R^2$, $R^3$, $R^4$, $R^5$ and $R^6$ being other than H, at least one of $R^1$, $R^2$, $R^3$ and $R^6$ being other than H, when $R^4$ and $R^5$ are both methyl and when $R^4$ and $R^5$ are both Cl, and at least one of $R^1$, $R^2$, $R^3$, $R^4$ and $R^6$ being other than H when $R^5$ is Cl. In addition, as pointed out supra, salts, (for example acid addition salts) and functional derivatives of the quinoxaline derivatives are included within the scope of this invention. Functional derivatives of the quinoxaline derivatives which may be mentioned include inter alia the N-oxides, for example, the 1-mono-oxide and 1,4-dioxides.

Salts which may be mentioned include the acid addition salts and functional derivatives include inter alia the N-oxides, for example the 1-mono-oxide and 1,4-dioxide.

Compounds falling within the scope of the above formula which are particularly preferred include, but are not limited to, the following: 2-methyl-5,6,7,8-tetrachloroquinoxaline, 6-bromo-5,7,8 - trichloroquinoxaline, 6 - fluoro - 5,7,8 - trichloroquinoxaline, 5,6,7,8 - tetrachloroquinoxaline, 2,5,6,7,8 - pentachloroquinoxaline and 2,3,6,7-tetrachloroquinoxaline.

According to a further embodiment of the invention, the instant compounds may be admixed with a major amount of an inert carrier, e.g. surface active agents and/or solid diluents, to form a highly active fungicidal composition.

The said quinoxaline derivatives and salts and derivatives thereof are active against a number of fungal organisms including for example certain of the organisms Erysiphe cichoracearum Phytophthora palmivora, Alternaria solani, Botrytis fabae, Fusarium oxysporum, Fomes annosus, Verticillium albo-atrum and Podosphaera leucotricha.

The fungicidal spectrum of the various compounds is different and for example 5,6,7,8-tetrachloroquinoxaline and 2-methyl-5,6,7,8-tetrachloroquinoxaline are particularly active against Erysiphe cichoracearum and other species of downy mildew such as Podosphaera leucotricha.

The said quinoxaline derivatives are substantially insoluble in water and may be incorporated in fungicidal compositions in any of the ways commonly adopted for the formulation of insoluble fungicides. Thus for example the said quinoxaline derivative may be incorporated into an aqueous suspension with or without wetting agents or into an emulsion and/or mixed with solid inert diluents.

Some salts and fungicidal derivatives of the quinoxaline derivatives according to the present invention are water-soluble and if desired may be used in the form of an aqueous solution.

The said quinoxaline derivative or a salt or functional derivative thereof may also be mixed with a wetting agent, with or without the incorporation of powdered or divided solid materials, so that a wettable product is obtained which is capable of use as such or as a suspension or dispersion in water.

The said quinoxaline derivative or a salt or functional derivative thereof may be incorporated for example with solid inert media comprising powdered or divided solid materials, for example clays, sands, talc, mica, fertilizers and the like, such products either comprising dust or larger particle size materials.

The said quinoxaline derivative or a salt or functional derivative thereof may be incorporated for example with solid inert media comprising powdered or divided solid materials, as referred to above, together with a wetting agent, so that a wettable product is obtained which is capable of use as such or as a suspension or dispersion in water.

The wetting agents used may comprise anionic compounds such as for example soaps, fatty sulphate esters such as dodecyl sodium sulphate, fatty aromatic sulphonates such as alkylbenzene sulphonates such as the amide condensation product of oleic acid and N-methyl taurine or sodium sulphonate of dioctyl succinate. The wetting agents may also comprise nonionic agents such as for example condensation products of fatty acids, fatty alcohols or fatty substituted phenols with ethylene oxide, or fatty esters and ethers of sugar or polyhydric alcohols, or the products obtained from the latter by condensation with ethylene oxide, or the products known as block copolymers of ethylene oxide and propylene oxide. The wetting agents may also comprise cationic agents such as for example cetyl trimethylammonium bromide and the like.

If desired, the fungicidal compositions according to the present invention may contain in addition to the said quinoxaline derivative or a salt or functional derivative thereof other agricultural chemicals such as herbicides, fungicides, pesticides, plant growth regulants and the like.

According to one embodiment of the invention, the said quinoxaline derivative or a salt or functional derivative thereof is mixed with other fungicides such as for example sulphur, copper compounds such as cuprous oxide or copper oxychloride, nickel compounds such as nickel hydroxide or organic fungicides such as tetramethyl-thiuram disulphide or salts of ethylenebisdithiocarbamic acid.

The following examples are given to illustrate the present invention:

Example 1

Tetrachloro-ortho-phenylene diamine (24.6 g.) was dissolved in ethanol (250 ml.) by heating and brought to reflux. Glyoxal solution (50 ml. 30%) was then added, and the mixture refluxed for one hour. When cooled the product was obtained by diluting the mixture with a copious quantity of water, filtering off the precipitated solid and recrystallizing from ethanol.

The product 5,6,7,8-tetrachloroquinoxaline melted at 189.5 to 190.5° C.

*Analysis.*—Found: C, 35.70; H, 0.80; N, 10.50; Cl, 52.5. $C_8H_2Cl_4N_2$ requires: C, 35.86; H, 0.75; N, 10.46; Cl, 52.93%.

Example 2

Tetrachloro-ortho-phenylene diamine (24.6 g.) was dissolved in ethanol (250 ml.) by heating and brought to reflux. Pyruvic aldehyde solution (50 ml. 25%) was then added and the mixture refluxed for a further 30 minutes. The resultant product which precipitated in the reaction mixture was filtered off, recrystallized from ethanol/water then iso-octane.

The product 2-methyl-5,6,7,9-tetrachloroquinoxaline melted at 174–175° C.

*Analysis.*—Found: C, 38.45; H, 1.60; N, 10.05; Cl, 49.80. $C_9H_4Cl_4N_2$ requires: C, 38.33; H, 1.43; N, 9.93; Cl, 50.29%.

Example 3

Concentrated hydrochloric acid (25 ml.) was added to the refluxing solution of tetrachloro-ortho-phenylene diamine (24.6 g.) and dimethyl glyoxime (20 g.) in ethanol (250 ml.) The mixture was refluxed for one hour and the resultant precipitated product was filtered off from the hot solution. The product was purified by recrystallizing from ethyl acetate.

The product 2,3-dimethyl-5,6,7,8-tetrachloroquinoxaline was a pink solid which melted at 197–198° C.

*Analysis.*—Found: C, 40.50; H, 2.20; N, 9.60; Cl, 47.20. $C_{10}H_6Cl_4N_2$ requires: C, 40.57; H, 2.04; N, 9.47; Cl, 47.92%.

Example 4

50 parts of 5,6,7,8-tetrachloroquinoxaline were ground with 200 parts of kaolin and 20 parts of dodecyl sodium sulphate. The resulting dry powder was suspended in water at various concentrations.

Example 5

50 parts of 2-methyl - 5,6,7,8-tetrachloroquinoxaline were ground with 200 parts of kaolin and 20 parts of dodecyl sodium sulphate. The resulting dry powder was suspended in water at various concentrations.

Example 6

Glyoxal (10 g.) in water (30 ml.) was added dropwise to a refluxing solution of 3-bromo-4,5,6-trichloro-ortho-phenylene diamine (14.5 g.). The mixture was refluxed for one hour, cooled and water (200 ml.) was added. The precipitate was filtered off, washed with water and recrystallized twice from petroleum ether (boiling point 80–100° C.) (charcoal) to give almost colorless needles of 5-bromo-6,7,8-trichloroquinoxaline (11.2 g., melting point 199–201° C.).

*Analysis.*—Found: C, 30.95; H, 0.90; Br, 25.70; Cl, 33.80; N, 9.05. $C_8H_2BrCl_3N_2$ requires: C, 30.76; H, 0.65; Br, 25.58; Cl, 34.05; N, 8.97%.

Example 7

4-fluoro-3,5,6-trichloro-ortho-phenylene diamine (7.65 g.) was dissolved in hot ethanol (72 ml.) and glyoxal (6.7 g.) in water (20 ml.) was added dropwise to the refluxing solution. The mixture was refluxed for one hour and was kept at 0° C. overnight. The crystalline product was filtered off, washed with a small amount of ethanol and water. Recrystallization from ethanol (charcoal) gave pink needles of the 6-fluoro-5,7,8-trichloroquinoxaline (5.5 g., melting point 155–157° C.).

*Analysis.*— Found: C, 38.30; H, 0.85; N, 11.05. $C_8H_2Cl_3FN_2$ requires: C, 38.21; H, 0.80; N, 11.14%.

Example 8

4-bromo-3,5,6-trichloro-ortho-phenylene diamine (11.6 g.) was dissolved in hot ethanol (100 ml.) and glyoxal (8 g.) in water (24 ml.) was added dropwise to the refluxing solution. The mixture was refluxed for one hour. The solution was poured into water (1000 ml.) and the precipitate was filtered off, washed with water and dried. Recrystallization from acetic acid (charcoal) gave the 6-bromo-5,7,8-trichloroquinoxaline (5.7 g., melting point 306–308° C.).

*Analysis.*—Found: Br, 25.65. $C_8H_2BrCl_3N_2$ requires: Br, 25.58%.

Example 9

A solution of glyoxal (6.7 g.) in water (20 ml.) was added dropwise to the refluxing solution of 4-methoxy-3,5,6-trichloro-ortho-phenylene diamine (8.03 g.) in ethanol (72 ml.). The mixture was refluxed for one hour and was kept at 0° C. for 12 hours. The product was filtered off, washed with a small amount of ethanol and water. Recrystallization from ethanol (charcoal) gave slightly colored needles of the 6-methoxy-5,7,8-trichloroquinoxaline (6.1 g., melting point 153–154° C.).

*Analysis.*—Found: C, 41.32; H, 2.10; Cl, 40.25; N, 10.85. $C_9H_5Cl_3N_2O$ requires: C, 41.02; H, 1.91; Cl, 40.37; N, 10.63%.

Example 10

4-fluoro-ortho-phenylene diamine (12.6 g.) was dissolved in ethanol (90 ml.) and glyoxal (20 g.) in water (60 ml.) was added dropwise to the refluxing solution. The mixture was refluxed for one hour and poured into water (400 ml.). The solution was extracted with ether and the extracts were dried ($Na_2SO_4$). The ether was evaporated to give a residue, which was distilled, giving the colorless 6-fluoro-quinoxaline (10.7 g., boiling point 103–104° C./15 mm.) which solidified (melting point 35–36° C.).

*Analysis.* — Found: C, 64.70; H, 3.70; N, 18.90. $C_8H_5FN_2$ requires: C, 64.86; H, 3.40; N, 18.91%.

Example 11

Acetic anhydride (7.6 ml.) was added gradually to a solution of 6-aminoquinoxaline (8.4 g.) in benzene (112 ml.). The mixture was refluxed for 1½ hours and cooled to room temperature. The pale brown product was filtered off and recrystallized twice from water (charcoal) to give the 6 - acetylaminoquinoxaline (5.8 g., melting point 196–197° C.).

*Analysis.*—Found: C, 64.05; H, 5.00; N, 22.60. Calculated for $C_{10}H_9N_3O$: C, 64.16; H, 4.85; N, 22.45%.

Example 12

Toluene-3,4-diamine (24.4 g.) was dissolved in water (125 ml.) at 40° C. and a solution of glyoxal (40 g.) in water (120 ml.) was added dropwise. The mixture was refluxed for one hour. The solution was cooled, extracted with ether and the extracts were dried ($Na_2SO_4$). The ether was evaporated and the residue distilled. The fraction, boiling point 128–129° C./20 mm. was collected. Redistillation gave the pure colorless 6-methylquinoxaline (16.1 g., boiling point 135° C./26 mm.).

*Analysis.*—Found: N, 19.25. Calculated for $C_9H_8N_2$: N, 19.43%.

Example 13

Aqueous glyoxylic acid (60 g., 40%) was added dropwise to a stirred, refluxing solution of tetrachloro-ortho-phenylene diamine (73.8 g.), dissolved in absolute alcohol (750 ml.). A yellow solid separated rapidly from the solution and after heating for a further 30 minutes, the mixture was set aside. The product 2-hydroxy-5,6,7,8-tetrachloroquinoxaline, was filtered off, washed with ethanol and dried giving a pale yellow powder (74.2 g.), melting point greater than 300° C.

The pure 2-hydroxy-5,6,7,8-tetrachloroquinoxaline may be obtained by dissolution in alkali, filtration and reprecipitation with glacial acetic acid. Crystallization of the dried precipitate from nitrobenzene gave a solid, melting point 319° C.

*Analysis.*—Found: C, 33.70; H, 0.80; Cl, 49.60; N, 9.80. $C_8H_2Cl_4N_2O$ requires: C, 33.84; H, 0.71; Cl, 49.95; N, 9.87%.

Example 14

Crude 2-hydroxy-5,6,7,8-tetrachloroquinoxaline (127.8 g.) and phosphorus pentachloride (93.6 g.) were heated in phosphorus oxychloride (450 ml.) at 110–120° C. until solution was obtained (approximately 45 minutes). After heating for a further 15 minutes, the mixture was allowed to cool and the deposited solid filtered off, washed with carbon tetrachloride and dried. This solid (100 g.) was crystallized from ethyl acetate (charcoal) to yield 2,5,6,7,8 - pentachloroquinoxaline as almost colorless needles (84 g.) melting point 170–172° C.

*Analysis.* — Found: C, 31.65; H, 0.50; N, 9.50. $C_8HCl_5N_2$ requires: C, 31.77; H, 0.33; N, 9.27%.

Example 15

2,5,6,7,8-penta-chloroquinoxaline (15.1 g.) was dissolved in ethyl acetate (300 ml.) and treated dropwise at reflux temperature with a solution of sodium metal (1.15 g.) in dry methanol (100 ml.). An instantaneous precipitation took place and after heating for a further 15 minutes on completion of the addition, the reaction mixture was allowed to cool. The deposited solids were collected, washed with a little fresh ethyl acetate, and dried. Extraction with boiling ethyl acetate (about 1.1) of the dried solid, gave, after hot filtration to remove insoluble material, 2-methoxy - 5,6,7,8 - tetrachloroquinoxaline as colorless needles (7.6 g.), melting point 180–182° C.

*Analysis.*—Found: C, 36.30; H, 1.45; Cl, 47.45; N, 9.50. $C_9H_4Cl_4N_2O$ requires: C, 36.28; H, 1.35; Cl, 47.60; N, 9.40%.

Example 16

The process of Example 15 was repeated using dry ethanol in place of methanol. Recrystallization from dioxan gave 2-ethoxy-5,6,7,8-tetrachloroquinoxaline (6.9 g.) melting point 171–173° C.

*Analysis.*—Found: C, 38.45; H, 1.90; Cl, 45.45; N, 9.00. $C_{10}H_6Cl_4N_2O$ requires: C, 38.49; H, 1.94; Cl, 45.46; N, 8.98%.

Example 17

Tetrachloro-ortho-phenylene diamine (12.3 g.) was dissolved in absolute alcohol (150 ml.) and a solution of phenyl glyoxal (6.7 g.), in the minimum volume of alcohol, added at reflux temperature to the stirred solution. After a short interval, a solid began to separate from the solution. Heating was continued for a further 15 minutes and the mixture then set aside to cool. The product was collected, washed with ethanol and dried (11.8 g.). This solid was crystallized from dioxan (ca. 500 ml.) to give cream colored needles (8.6 g.) of 2-phenyl-5,6,7,8-tetrachloroquinoxaline.

*Analysis.*—Found: C, 48.70; H, 1.85; Cl, 41.15; N, 8.30. $C_{14}H_6Cl_4N_2$ requires: C, 48.87; H, 1.76; Cl, 41.23; N, 8.14%.

Example 18

A hot solution of penta-hydroxyphenyl glyoxal hydrate (8.4 g.) in water (20 ml.) was added dropwise to a refluxing solution of tetrachloro-ortho-phenylene diamine (12.3 g.) in absolute alcohol (125 ml.). After about 15 minutes, a yellow precipitate was deposited from solution. Heating and stirring were continued for a further 15 minutes and the mixture set aside. The precipitate was collected, washed with ethanol, and dried (13.9 g.). Crystallization from 2-ethoxyethanol (large volume) gave stout yellow needles (11.9 g.) of 2-4'-hydroxyphenyl-5,6,7,8-tetrachloroquinoxaline, melting point 313° C.

*Analysis.*—Found: C, 47.00; H, 1.70; Cl, 39.25; N, 7.70. $C_{14}H_6Cl_4N_2O$ requires: C, 46.69; H, 1.68; Cl, 39.40; N, 7.78%.

Example 19

4,5-dinitro-orthophenylene diamine (4.5 g.) was dissolved in hot ethanol (100 ml.) and a 30% aqueous solution of glyoxal hydrate (2.5 g.) added to the stirred refluxing solution. Heating was continued for a further hour when the mixture was set aside to cool. The crystalline precipitate was collected, washed with ethanol and ether, and dried. The solid was crystallized twice from glacial acetic acid (charcoal) to give colorless plates of 6,7-dinitroquinoxaline, melting point 193–194° C.

*Analysis.* — Found: C, 43.55; H, 2.0; N, 25.95. $C_8H_4N_4O_4$ requires: C, 43.64; H, 1.83; N, 25.45%.

Example 20

75 mls. of 30% glyoxal solution was added to a refluxing solution of 31.5 grams of 3,4,5-trichloro-orthophenylene diamine in 250 mls. of ethanol. The mixture was refluxed for 40 minutes, cooled and diluted with an equal quantity of water.

The resultant product which precipiated from the reaction mixture was filtered off and recrystallized from aqueous ethanol giving 5,6,7,-trichloroquinoxaline as a solid of melting point 138–139° C.

*Analysis.*—Found: C, 40.95; H, 1.50; Cl, 45.05; N, 11.70. Theory: C, 41.15; H, 1.30; Cl, 45.55; N, 12.00%.

Example 21

100 mls. of 30% glyoxal solution was added to a refluxing solution of 42.0 grams of 3,5,6-trichloro-orthophenylene diamine in 500 mls. of ethanol. The mixture was refluxed for 60 minutes, cooled and diluted with an equal quantity of water.

The resultant product which precipitated from the reaction mixture was filtered off and recrystallized from aqueous ethanol giving 5,6,8-trichloroquinoxaline as a solid of melting point 178.5 to 179.5° C.

*Analysis.*—Found: C, 40.70; H, 1.60; Cl, 45.25; N, 12.00. Theory: C, 41.15; H, 1.30; Cl, 45.55; N, 12.00.

Example 22

50 mls. of 25% pyruvic aldehyde solution was added to a refluxing solution of 21.0 grams of 3,5,6-trichloro-orthophenylene diamine in 250 mls. of ethanol. The mixture was refluxed for 30 minutes, cooled and diluted with an equal quantity of water. The resultant product was filtered off and recrystallized from aqueous ethanol giving (2)3-methyl-5,6,8-trichloroquinoxaline as a solid of melting point 146–147° C.

*Analysis.*—Found: C, 43.70; H, 2.20; Cl, 42.85; N, 11.15. Theory: C, 43.67; H, 2.04; Cl, 42.97; N, 11.32%.

Example 23

21.35 grams of 3,5-dichloro-ortho-phenylene diamine hydrochloride, 50 millilitres of 25% pyruvic aldehyde solution and 25.0 grams of anhydrous sodium carbonate were refluxed together for 30 minutes in 250 millilitres of ethanol. The mixture was then cooled and diluted with an equal quantity of water. The resultant product which precipitated was filtered off and recrystallized from aqueous ethanol giving (2)3-methyl-5,7-dichloroquinoxaline as a solid of melting point 134.5 to 135.5° C.

*Analysis.*—Found: C, 50.60; H, 3.00; Cl, 32.30; N, 13.05. Theory: C, 50.73; H, 2.84; Cl, 33.28; N, 13.15%.

Further compounds which may be made in accordance with the processes indicated in the preceding examples include: 2 - benzyl-5,6,7,8-tetrachloroquinoxaline, 2 - (p-chlorobenzyl) - 5,6,7,8-tetrachloroquinoxaline, 6 - aminoquinoxaline, 6-dimethylaminoquinoxaline and 6-chloroethylquinoxaline.

Example 24

Aqueous suspensions of the quinoxaline derivatives identified below were prepared by grinding 50 parts of the quinoxaline with 200 parts of kaolin and 20 parts of dodecyl sodium sulphate. The resulting dry powder was suspended in water at various concentrations. Different plots of young cucumber plants (*Cucumis sativus*) were then sprayed with the aqueous suspensions containing respectively 2000, 1000 and 500 parts per million (p.p.m.) of the quinoxaline derivative until the leaves were completely wetted. After the deposit had dried on the leaves, the leaves were inoculated with spores of *Erisiphe cichoracearum*. The infected plants were kept at 25° C. for 14 days, the first 24 hours of which they were kept at a relative humidity of near 100%. At the end of this period the development of fungus on the leaves was assessed visually as a percentage of the development of the fungus on the untreated control plants. The results obtained are given in the following Table 1.

Solely by way of comparison quinoxaline was examined in the same way, and the results obtained are also given below.

TABLE 1
Control of *Erisiphe cichoracearum* on Cucumber Plants

| Compound | Development of fungus | | |
| --- | --- | --- | --- |
| | 2,000 p.p.m. | 1,000 p.p.m. | 50 p.p.m |
| 5,6,7,8-tetrachloroquinoxaline, percent | 0 | 5 | 11 |
| 5,7,8-trichloro-6-methylquinoxaline, percent | 28 | 37 | 52 |
| 5,6,7,8-tetrachloro-2-methylquinoxaline, percent | 1 | 8 | 14 |
| 5-bromo-6,7,8-trichloroquinoxaline, percent | 25 | 41 | 55 |
| 6-bromo-5,7,8-trichloroquinoxaline, percent | 6 | 34 | 40 |
| 2,3,6,7-tetrachloroquinoxaline, percent | 14 | 19 | 24 |
| Quinoxaline, percent | 100 | 100 | 100 |

Example 25

Aqueous suspensions of the quinoxaline derivatives identified below were prepared by grinding 50 parts of the quinoxaline with 200 parts of kaolin and 20 parts of dodecyl sodium sulphate. The resulting dry powder was suspended in water at various concentrations. Different plots of young field bean plants (*Vicia faba*) were then sprayed with these aqueous suspensions containing respectively 2000, 1000 and 500 parts per million (p.p.m.) of the quinoxaline derivative until the leaves were completely wetted. After the deposit had dried on the leaves, the leaves were inoculated with spores of *Botrytis fabae*. The infected plants were kept at 20° C. and a relative humidity of near 100% for five days. At the end of this period the development of fungus on the leaves was assessed visually as a percentage of development of fungus on the untreated control plants. The results obtained are given in the following Table 2.

TABLE 2
Control of *Botrytis fabae* on Field Beans

| Compound | Development of fungus | | |
| --- | --- | --- | --- |
| | 2,000 p.p.m. | 1,000 p.p.m. | 500 p.p.m. |
| 5,7,8-trichloro-6-methylquinoxaline, percent | 35 | 50 | 54 |
| 5,7-dichloro-3-methylquinoxaline, percent | 33 | 51 | 57 |
| 6,7-dinitroquinoxaline, percent | 32 | 51 | 61 |
| 5,6,7-trichloroquinoxaline, percent | 45 | 46 | 59 |
| 5,6,8-trichloro-3-methylquinoxaline, percent | 43 | 56 | 60 |
| 5-bromo-6,7,8-trichloroquinoxaline, percent | 32 | 38 | 70 |

Example 26

Aqueous suspensions of the quinoxaline derivatives identified below were prepared by grinding 50 parts of the quinoxaline with 200 parts of kaolin and 20 parts of dodecyl sodium sulphate. The resulting dry powder was suspended in water at various concentrations. Different plots of young French bean plants (*Phaseolus vulgaris*) were than sprayed with these aqueous suspensions containing respectively 2000, 1000 and 500 parts per million (p.p.m.) of the quinoxaline derivative until the leaves were completely wetted. After the deposit had dried on the leaves, the leaves were inoculated with spores of *Uromyces phaseoli*. The infected plants were kept at 20° C. for 14 days, for the first 24 hours of which they were kept at a relative humidity of 100% and in the absence of light. At the end of this period the development of fungus on the leaves was assessed visually as a perecentage of the development of the fungus on untreated control plants. The results obtained are given in the following Table 3.

TABLE 3
Control of *Uromyces phaseoli* on French Beans

| Compound | Development of fungus | | |
| --- | --- | --- | --- |
| | 2,000 p.p.m. | 1,000 p.p.m. | 500 p.p.m. |
| 5,6,8-trichloroquinoxaline, percent | 9 | 20 | 16 |
| 2,5,6,7,8-pentachloroquinoxaline, percent | 28 | 37 | 62 |

Example 27

Aqueous suspensions of a dry powder of 2-hydroxy-5,6,7,8-tetrachloroquinoxaline were prepared in a similar manner to Example 24. Plots of young tomato plants (*Lycopersicum esculentum*) were then sprayed with these aqueous suspensions containing 2000 and 1000 parts per million (p.p.m.) of 2-hydroxy-5,6,7,8-tetrachloroquinoxaline until the leaves were completely wetted. After the deposit had dried on the leaves, the leaves were inoculated with spores of *Alternaria solani*. The infected plants were kept at a temperature of 20° S. and at a relative humidity of near 100% for 8 days. At the end of this period the development of fungus on the leaves was assessed visually as a percentage of the development of the fungus on untreated control plants. The plants sprayed at 2000 p.p.m. showed 26% development of fungus and those sprayed at 1000 p.p.m. showed 30% development of fungus.

Example 28

5,6,7,8-tetrachloroquinoxaline, formulated as a wettable powder, was suspended in water at concentrations of 500 and 100 parts of active ingredients per million of water and sprayed to run-off on the foliage of mature apple trees of varieties Jonathan and Golden Delicious in an orchard in South Africa.

Spraying was repeated at intervals, the dates of application being shown in the table below. Some trees were left unsprayed as controls. The percentage of leaves affected by the mildew, *Podosphaera leucotricha*, among the first five leaves of each shoot, were assessed at the dates indicated.

| Variety | Concentration | Dates of spraying | | | | | |
|---|---|---|---|---|---|---|---|
| | | Oct. 22 | Nov. 1 | Nov. 15 | Nov. 26 | Dec. 5 | Dec. 14 |
| | | Dates of assessment | | | | | |
| | | Nov. 24 | Dec. 3 | Dec. 12 | Dec. 29 | Jan. 16 | |
| Jonathan | 500 compound | 1 | 0 | 14 | 29 | 33 | |
| Do | 1,000 compound | 0 | 0 | 14 | 22 | 23 | |
| Do | Control | 12 | 13 | 63 | 63 | 63 | |
| Golden Delicious | 500 compound | 4 | 9 | 5 | 24 | 34 | |
| Do | 1,000 compound | 1 | 1 | 3 | 4 | 22 | |
| Do | Control | 41 | 76 | 78 | 92 | 85 | |

Example 29

Plots of young cucumber plants (*Cucumis sativus*) were inoculated with the spores of *Erisiphe cichoaracearum*. The infected plants were kept at 25° C. for 14 days, the first 24 hours of which they were kept at a relative humidity of nearly 100%. At the end of this period the fungus had developed extensively, and the leaves were covered with the white mycelium of the fungus.

An aqueous suspension was prepared by grinding 50 parts of 2,3,6,7-tetrachloroquinoxaline with 200 parts of kaolin and 20 parts of dodecyl sodium sulphate. The resulting dry powder was suspended in water at various concentrations, to give aqueous suspensions containing respectively 2000, 1000 and 500 parts per million (p.p.m.) of 2,3,6,7-tetrachloroquinoxaline. Different plots of the infected cucumber plants were sprayed with these suspensions until the leaves were completely wetted. The plants were kept at 25° C. for a further 2 days and at the end of this period the amount of fungus remaining on the leaves was assessed visually as a percentage of the fungus on the control plants. The results are given below:

Concentration, p.p.m.: Fungal growth reduced to (percent)
2000 _____ 8
1000 _____ 15
500 _____ 45

We claim:
1. A method of combating plant fungi by applying to plant growth to be protected against fungi a fungicidally effective quantity of a compound selected from the group consisting of compounds of the formula

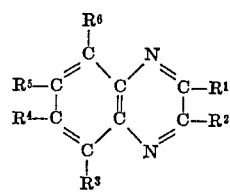

wherein $R^1$ and $R^2$, independently, are selected from the group consisting of hydrogen, lower alkyl and the halogens and wherein $R^3$, $R^4$, $R^5$ and $R^6$ are all halogens selected independently.

2. A method according to claim 1 wherein the compound is 5,6,7,8-tetrachloroquinoxaline.

3. A method according to claim 1 wherein the compound is 2-methyl-5,6,7,8-tetrachloroquinoxaline.

4. A method according to claim 1 wherein the compound is 6-bromo-5,7,8-trichloroquinoxaline.

5. A method according to claim 1 wherein the compound is 6-fluoro-5,7,8-trichloroquinoxaline.

6. A method according to claim 1 wherein the compound is 2,5,6,7,8-pentachloroquinoxaline.

7. A fungicidal composition comprising a fungicidally effective amount of a compound of the formula

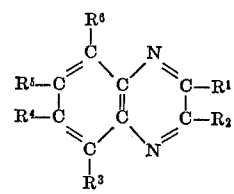

wherein $R^1$ and $R^2$, independently, are selected from the group consisting of hydrogen, lower alkyl and the halogens and wherein $R^3$, $R^4$, $R^5$ and $R^6$ are all halogens selected independently, together with a material selected from the group consisting of inert carriers, solid diluents and surface active agents.

References Cited

UNITED STATES PATENTS

| | | | |
|---|---|---|---|
| 2,921,937 | 1/1960 | Gordon et al. | 260—250 |
| 3,029,237 | 4/1962 | Sasse et al. | 167—33 |
| 3,029,238 | 4/1962 | Sasse et al. | 167—33 |
| 3,146,161 | 8/1964 | Grewe et al. | 167—33 |
| 3,223,706 | 12/1965 | Sasse et al. | 260—250 |
| 3,355,352 | 11/1967 | Hattori et al. | 167—33 |

(Other references on following page)

FOREIGN PATENTS 1,041,011  9/1966  Great Britain.

OTHER REFERENCES

Grewe et al., "Control of Mildew" (1961), Ger. 1,100,-372, CA 55, p. 26353 (1961).

Lindquist et al., "Quinoxaline Derivatives" (1952), Brit. 668,412, CA 47, pp. 5458-59 (1953).

Lindquist, "Quinoxalines" (1952), Brit. 684,346, CA 48, p. 1447 (1954).

Haworth et al., "Synthetic Antimalarials, Some Derivatives, etc." (1948), J. Chem. Soc., pp. 777-82 (1948).

Acheson, "Several Quinoxalines of Biological Interest" (1956), J. Chem. Soc., pp. 4731-35 (1956).

Cheeseman, "Quinoxalines and Related Compounds, etc." (1961), J. Chem. Soc. pp. 1170-76 (1962).

LEWIS GOTTS, *Primary Examiner.*

G. HOLLRAH, *Assistant Examiner.*

U.S. Cl. X.R.

260—250